United States Patent [19]

Ilk

[11] 3,955,954

[45] May 11, 1976

[54] METHOD FOR THE PRODUCTION OF STEMMED GLASSWARE

[76] Inventor: Emil Ilk, Ahornweg 4, 8372 Zwiesel, Germany

[22] Filed: Apr. 7, 1975

[21] Appl. No.: 565,573

Related U.S. Application Data

[63] Continuation-in-part of Ser. No. 415,640, Nov. 14, 1973, abandoned, which is a continuation-in-part of Ser. No. 224,595, Feb. 8, 1972, abandoned.

[52] U.S. Cl. .................................. 65/42; 65/79; 65/156; 65/307
[51] Int. Cl.² ..................... C03B 23/22; C03B 9/04
[58] Field of Search ............ 65/42, 43, 77, 79, 109, 65/156, 307, 322, DIG. 10

[56] References Cited
UNITED STATES PATENTS

| | | | |
|---|---|---|---|
| 509,250 | 11/1893 | Schaub | 65/156 |
| 1,798,308 | 3/1931 | Cornwell | 65/156 |
| 1,853,002 | 4/1932 | Howard | 65/122 |
| 1,902,140 | 3/1933 | Rowe | 65/123 X |
| 3,130,028 | 4/1964 | Seymour | 65/156 X |

FOREIGN PATENTS OR APPLICATIONS

| | | | |
|---|---|---|---|
| 1,138,189 | 8/1959 | Germany | 65/156 |
| 4,524,462 | 9/1966 | Japan | 65/DIG. 10 |
| 4,621,718 | 4/1967 | Japan | 65/DIG. 10 |
| 453,543 | 11/1965 | Japan | 65/DIG. 10 |

*Primary Examiner*—Robert L. Lindsay, Jr.
*Attorney, Agent, or Firm*—Fitch, Even, Tabin & Luedeka

[57] ABSTRACT

Stemmed glassware is produced by a method and apparatus in which the stem is formed separately and is subsequently joined to the cup at the final phase of the blowing operation of the cup glass. In the apparatus a first rotatable platen having cup molds is provided for blowing of the cups and a second rotatable platen having stem molds is provided for forming the stems. A drop of glass for producing the stems is dropped through a very short distance of about 20 to 40 mm. to prevent excessive cooling of the glass drop and to assist in centering the glass drop in longitudinally divided stem molds. A ring centers the mold halves of the stem molds and a surface on the ring molds a part of the stem base. The second platen rotates the stem molds through a pressing station at which the glass drop is pressed to form the stem to a transfer station at which a transfer means transfers the finished stems from the second rotatable platen and attaches the stems to the cups on the first rotatable platen.

5 Claims, 4 Drawing Figures

METHOD FOR THE PRODUCTION OF STEMMED GLASSWARE

This application is a continuation-in-part application of co-pending application Ser. No. 415,640, entitled "Apparatus For The Production Of Stemmed Glassware" filed November 14, 1973 which in turn is a continuation-in-part application of Ser. No. 224,595, entitled "Method For The Production Of Stemmed Glasses", filed Feb. 8, 1972 both now abandoned.

The invention relates to an apparatus for the production of stems for glassware.

The present invention is directed to producing stemmed glassware having complex shaped stems with an upper or head portion of the stem of a larger cross-section than a central part of the stem. Also, the present invention is directed to producing glassware stems by forming a quantity of glass under pressure in a mold by a pressing die being lower from the top. Heretofore, when producing stems by pressing the glass from the top, the stems were limited to a simple shape which tapers regularly toward its head.

The present invention is also directed to producing glasses with stems in a two-part press mold with the pressing pressure exerted from a pressing die lowered from the top. When the glass cup is used as counter holder in such a process, the stem can be shaped directly to the surface of the cup which it is to join. However, in the prior art processes using the glass cup as a counter holder, the stem has been formed with a base having a protruding bridge formed at the joints of the mold. Therefore, quality glassware has not been produced successfully with this method.

Finally, another apparatus used for the production of stemmed glassware involves a divided mold and a ring mounted thereon which forms the top side of the base stem without the protruding bridges. In this apparatus, glass is introduced into a preliminary mold and pressed with a pressing die arriving from the bottom into the mold through a small aperture below the head of the stem base. In order for the air to be able to escape from the mold, a gap must be provided between the ring and the counter holder. The temperature and therefore the viscosity of the glass processed must be adjusted with maximum precision to prevent an excaping of the glass through said gap and to make possible a distribution of the glass in the preliminary form while maintaining the necessary pressing pressure.

So many parameters must be adjusted with maximum precision for the prior art apparatus in order to achieve the desired flow conduct of the glass that under this method a production of glass stems of completely uniform quality with shaped-on bases is almost impossible. Moreover, the glass must be cut out from the gathering mold, whereupon after amalgamating the head of the stem, the glass cup can be pressed to the stem. Because of this additional operation and due to the fact that a considerable amount of waste is produced, the profitability of this last mentioned method is very low.

The present invention obviates the above-mentioned difficulties and other difficulties in the prior art and provides an apparatus for the production of stemmed glassware having various kinds of profiled stems which can be produced in a simple and economical manner. With the present invention, the top side of the stem base is free from protruding bridges, flow waves are avoided, glasses are produced in a uniform high quality, and no excess glass results from the process.

Moreover, the apparatus for the manufacture of the glassware stems has a compact design and trouble-free operation, and can be adjustable for the manufacture of different shapes of glasses.

Another problem with prior apparatus for stemmed glassware production is that the height of the glass feeder above the mold has been extremely high, for example, 5 feet. A glass drop falling through such a 5-foot distance often results in the temperature of the drop having cooled substantially from the time of leaving the feeder to arrival in the mold. Depending on the circumstances, the temperature loss during the fall may be several times higher than the desirable deviation of less than 2° or 3° C. As the glass drop falls, it develops an outer skin which is tougher and cooler than the interior portion of the glass drop.

Another result of a long drop distance for the glass drop is the greater likelihood of the drop deposition in a non-centered position in the mold. When the drop is not centered in the mold, the drop's skin is pressed and spread non-uniformly to one side of the mold. Consequently, as and after the glass cools, the non-uniformly spread skin becomes the source of high internal stresses. A high percentage of stems will break due to these internal stresses. In contrast, if the drop is centered in the mold prior to pressing, the skin is spread more symmetrically and does not lead to the generation of such high internal stresses.

Accordingly, an object of the present invention is the formation of stemmed glassware having complex shapes without such high internal stresses therein in an automatic and simple manner.

Another object of the present invention is to produce a glass stem of complex shape without a seam between a press die and a vertically divided mold with a ring positioned on the top of the mold halves to precisely position the latter and to form a portion of the stem.

Other objects and advantages of the present invention will become apparent from the following detailed description taken in connection with the illustrated drawings in which.

Figure 1:
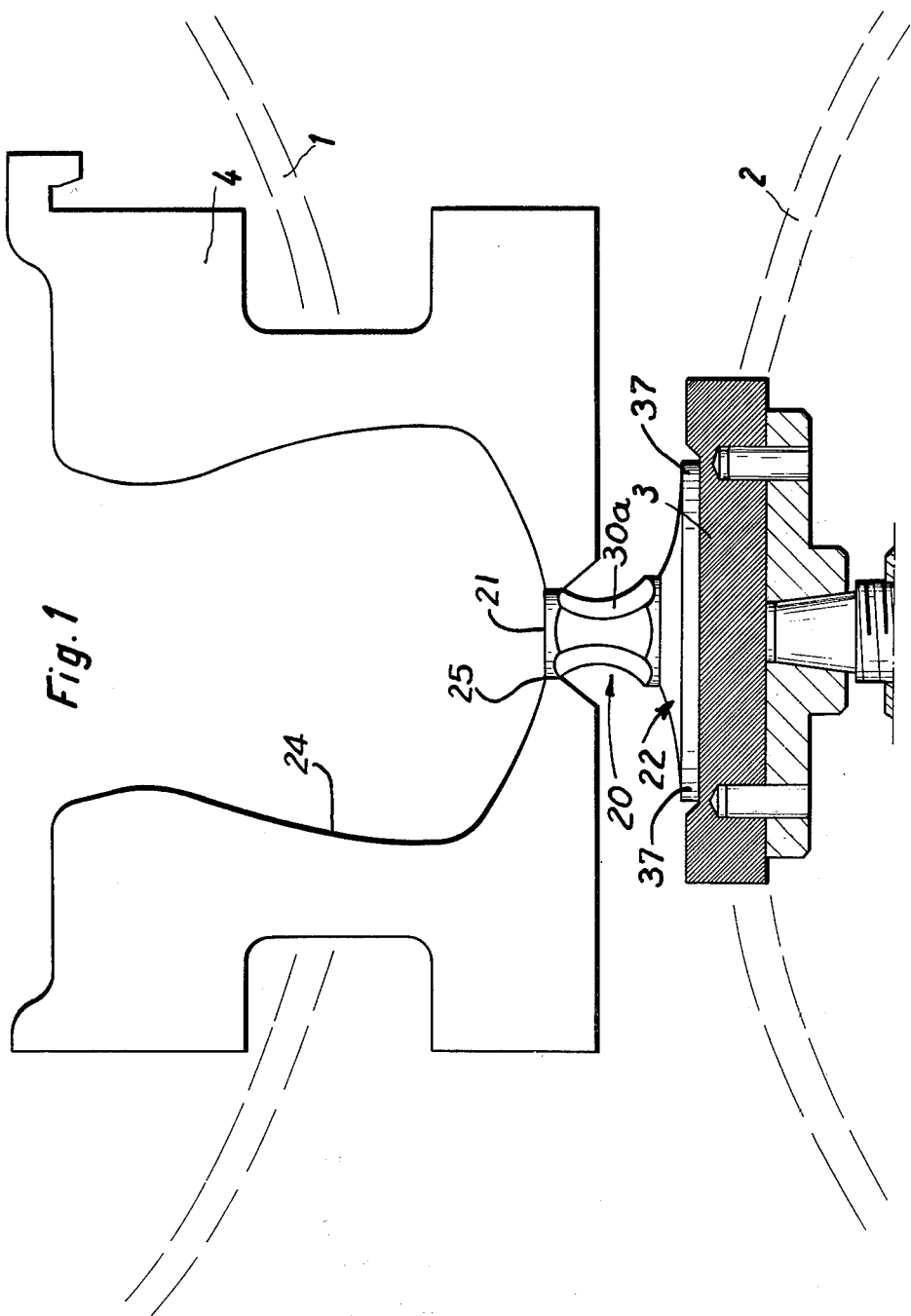
FIG. 1 shows a partially sectional view of an apparatus for the transfer of the stems to a cup.

As shown in the drawings for purposes of illustration, a glassware stem 20 (FIG. 1) is produced by dropping a drop of glass from a glass feeder 6 (FIG. 3) into an underlying mold formed by longitudinally split mold halves 7 and 8. After the glass drop is in the mold, a pressing die 14 (FIG. 2) and its co-operating pressing ring 15 press and squeeze the glass drop to form a complex shaped stem having, as best seen in FIG. 1, an enlarged stem base 22 with a narrowed intermediate portion 30a of lesser transverse cross section than a head 21 at one end of the stem or the base 22 at the other end of the stem. The glass stems are formed upside down with the base 22 being formed uppermost as seen from FIG. 2.

Figure 4:
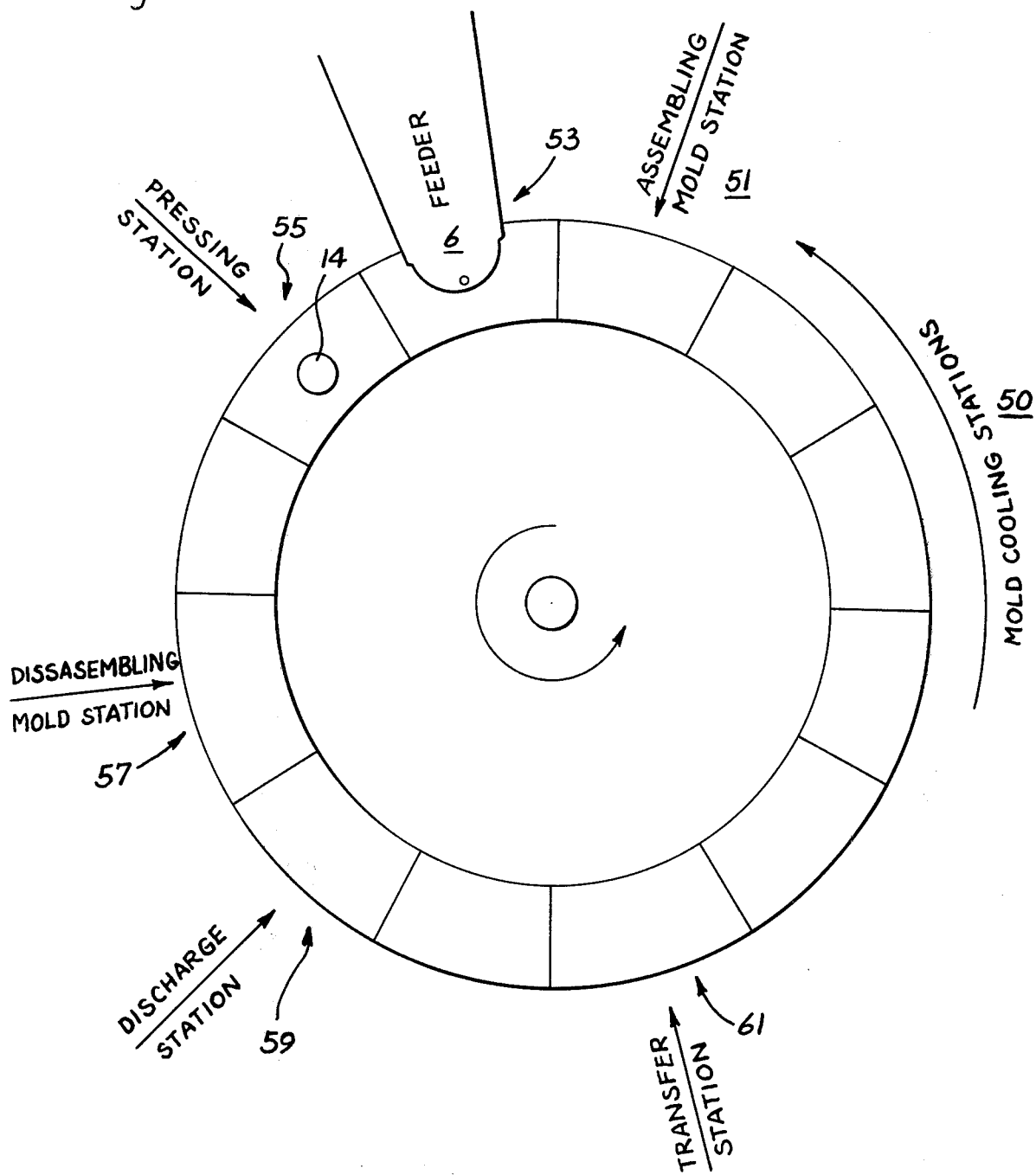
FIG. 4 is a diagrammatic illustration of the rotary platen and the various stations for the formation of a stem in accordance with the preferred embodiment of the invention.

As best seen in FIG. 4, the molds for forming the stems 20 are carried on a horizontally rotatable platen 2 which rotates about a central vertical axis to carry the molds from a mold cooling zone 50 at which the molds are cooled to the mold assembling zone 51 at which the mold halves are closed and assembled prior to receiving the glass drops from the glass feeder zone 53 at which is located the glass feeder 6. The platen carries the molds with the drops of glass therein to the pressing station 55 at which is located the pressing die 14 for pressing the glass drop to form the stem, as will be described in detail hereinafter. The platen then turns and carries the molds and formed stems to the disassembling station 57 at which the mold halves 7 and 8 are swung open. The stem is pushed upwardly through the mold ring at a discharge stem station 59. The stem is turned and held by a transfer apparatus 3 (FIG. 1) which is located at a transfer station 61 (FIG. 4) at a position between the rotary platen 2 for the stems and a rotary platen 1 (FIG. 1) carrying cup blow molds 4. The transfer apparatus 3 pushes the still warm head 21 of the stem through a bottom opening in a cup forming mold 4 carried by an overhead rotary platen 1. The cups are formed with configuration of the wall 24 of the cup mold. The finished stems are transferred while still hot and at a temperature sufficiently high that the stem head can be easily amalgamated with the cup glass to be attached thereto.

Herein the rotary platens 1 and 2 are each provided with a multiplicity of consecutive stations, e.g., 16 stations, where the finished objects and/or their prevailing shape remains for a certain time. For example, nine of the stations may be used for cooling the stems and/or cups and two stations may be used for shaping them.

If necessary, the stem 20 also may be pressed to the cup upon completion of the blowing operation. The blowing mold 4 is divided to make possible the forming out of the finished glass cup.

Figure 2:
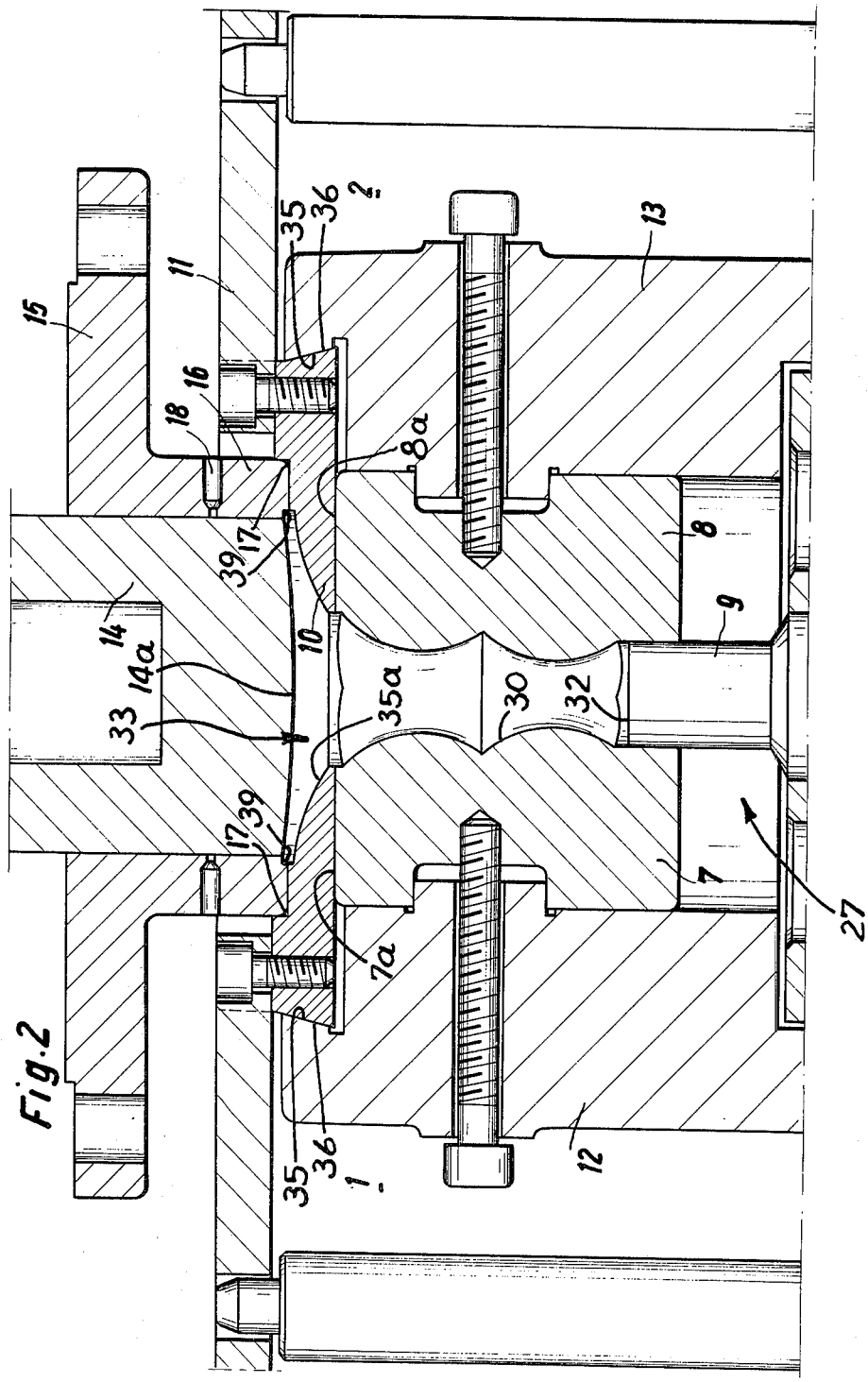
FIG. 2 shows a cross-sectional view through a mold according to the invention and its holding means.
Figure 3:
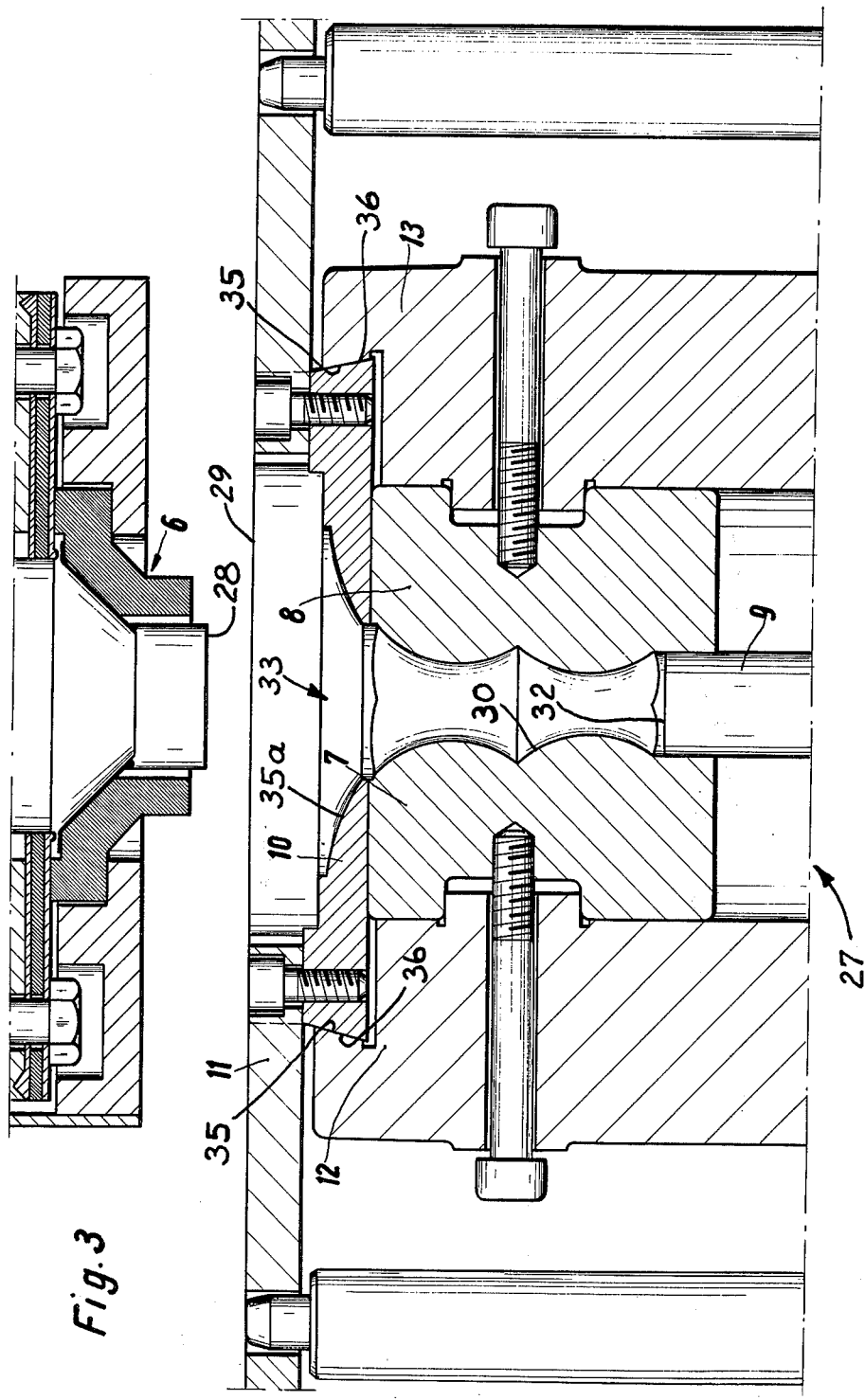
FIG. 3 shows a cross-sectional view for the loading station for the mold.

Turning now to the present invention and the preferred embodiment thereof, which is shown in FIGS. 2 and 3, a mold 27 is associated with the rotary platen 2. A glass feeder 6 is provided for the mold on the rotary platen 2, by which highly viscous glass is supplied in drop form, having a temperature ranging from 1100° to 1200° C. As stated above, the rotary platen for flowing the cups (not shown) is in accordance with designs of prior art, and its construction is known to the person skilled in the art.

Heretofore, the distance between the glass feeder and the stem mold has been very great, for example, about 5 feet, with the result that the small glass drops cooled appreciably, i.e., more than the 2° to 3° C. Also, because of this considerable height drop, the glass was not precisely and consistently centered in the mold 27.

In accordance with an important aspect of the invention, the height of the free drop of the glass from the lower end 28 of the glass feeder 6 to the top edge 29 of the mold has been reduced substantially from the conventional five feet to a range of about 20 mm to 40 mm, with 20 mm being preferred. Thus, with this short drop height, the glass does not cool nearly as much as heretofore in prior art apparatus and the short drop also assures more precise centering of the drop in the mold. The feeder 6 is stationary and a conventional Malta cross means positions the platen 2 and molds thereon precisely below the feeder 6 for the required period of time. As explained previously, the glass drop forms a tough, cooled skin during the drop and this skin acts to form a smooth surface for the stem. But, when the drop is not precisely centered as may occur more often during a long drop, the skin is located asymmetrically when pressed by the die 14 toward one side of the stem mold and after cooling high internal stresses may be developed in the stem. Thus, the shorter drop distance allows better control of the temperature of the glass drop and more precise centering of the glass drop in the mold. The temperature of the mold also is a factor in obtaining the desired skin and temperature for the glass drop as it is moved from the feeding station 53 to the nearly pressing station 55.

The feeder 6 for the rotary platen 2 must be able to accomplish a precise metering of the glass introduced, for example, the deviation in weight at a drop weight of 60 grams should only amount to ± 1 gram. For that purpose, the glass is placed in the feeder or in the feeder channel to a certain temperature which is maintained with a precision of 2° to 3° C. In the feeder itself, the discharging glass is then brought to its final temperature, on the basis of which a precisely metered quantity of glass exits through the cross section of the discharge of the feeder.

The last decisive addition of heat is preferably furnished by resistance heating of the glass, whereby a fully automatic control is accomplished by a transistorized circuit.

In order to avoid disturbances due to fluctuations in the line voltage, a device (not shown) for keeping the voltage constant may be used. In order to monitor the weight of the drop, a glass drop is removed and weighed during operations at periodic intervals; if necessary, this control also may be automated.

Referring now to FIGS. 2 and 3, mold 27 for producing the stem 20 with the stem base 22 comprises at least two mold parts in the form of mold halves 7 and 8 which when brought together produce a cavity defined by wall 30 for forming out the stem 20. The cavity is sealed at its lower end by a top wall 32 of a cylindrical counter holder 9. A ring 10 also coacts with the mold parts 7 and 8 and has a base forming aperture or recess 33 which is provided with a bottom wall 31 of a small diameter extending to an upwardly opening flat conical wall 35. The top side of the base forming aperture 33 must always be larger in dimension than the largest cross section dimension for the stem 20 to allow removal of the latter by pushing it through the ring 10.

In accordance with an important aspect of the invention, the ring 10 is mounted on a cross piece 11 which allows a small axial and radial movement of the ring 10 in order to make possible its precise positioning centrally to the mold pieces in the form of mold halves 7 and 8 and with tight adherence thereto. The cross piece 11 also keeps the ring 10 from falling when the mold halves 7 and 8 have been opened. The mold halves 7 and 8 preferably include two hinge parts 12 and 13 by which they can be moved apart for emptying the mold 27. The hinge parts 12 and 13 are pivotable at their lower edges; moreover, they are horizontally pivotable. Their movement is carried out pneumatically and mechanically.

Also, in accordance with an important aspect of the invention, the hinge parts 12 and 13 of the mold halves 7 and 8 have at their upper edge a downwardly opening frustoconical surface 35 which co-acts with a corresponding frustoconical surface 36 on the ring 10. The surfaces 35 and 36 of the ring 10 and of the hinge parts are ground in order to assure a precise positioning of the ring when the hinge parts converge. Because of the engagement of the reversely tapered, complementary frusto-conical surfaces 35 and 36, the ring is pressed so firmly against the mold parts 7 and 8 that any gap produced will not form a protrusion on the finished stem 20. By introducing the glass from the top, adjusted precisely in temperature and by the formation of a tough "skin" on the surface of the glass by contact with the colder mold, the formation of flow waves in the stem 20 is prevented and a formation of a protrusion or bridge at the separation surface between mold parts 7, 8 and the ring 10 is prevented.

The mold parts 7 and 8 and the ring 10 consist of a hard, temperature-stable material with a poor, heat conductivity characteristic, like, for example, Austenitic chrome-nickel steel.

The pressing pressure is provided by the press die 14 moving vertically and supplying the pressing pressure from the top. The press die 14 is surrounded concentrically by a cover or pressing ring 15 which leads the press die 14 and bears down against the press die 14 by springs (not shown).

The pressing ring 15 covers peripheral edge 37 (FIG. 2) of the base 22 of the glass stem and a groove 39 on its inner lower edge permits the design of a peripheral edge 37 at the bottom of the base 22.

The press die 14 is made from highly heat conductive material, for example, ferrite steel, and the press ring 15 is made likewise from highly heat conductive material, for example, sheel casting. In order to make possible a precise adjustment of the press die in relation to the mold 27, the press die 14 is guided in the press ring, both the press ring and the press die are provided with a certain angular mobility and the press ring in turn is guided in the last portion of its downward movement through the ring 10 having a central perforation into which the press ring 15 is fitted with its lower end.

In order to assure a perfect entry of the press ring 15 into the ring 10 with simultaneous alignment therebetween, the press ring 15 has at 16 and the ring 10 at 17 radii of 2 mm in each case.

To avoid overheating of the press die 14, it is chilled. To adjust the corresponding and desired flow conduct of the glass within the mold 27, the latter is heated (including the ring 10) and is maintained at a temperature ranging between 400° and 500° C. (752° and 932° F).

Compressed air is used to muster the pressing pressure which acts at a pressure of 1 atmosphere excess pressure on a piston surface (not shown) of 160 mm in diameter.

The air expelled during the pressing operation discharges through the gap between the press ring 15 and the press die 14 and through the holes 18.

Following the pressing operation, the press die 14 and the press ring 15 are returned. The platen 2 turns and carries the molds to the disassembling station 57 at which the hinge parts 12 and 13 are pulled apart. The platen 2 again turns to bring the open mold halves to the discharge station 59 at which the stem 20 is expelled upward from the counter holder 9. The platen 2 then rotates to the transfer station at which the stem is transferred to the rotary platen 1. Following the cooling of the mold halves at the mold cooling zone 50, the mold halves are closed at the mold assembling station 51. The processing cycle can be started again by feeding glass, when the mold 27 is again below the feeder 6.

The apparatus according to the invention visibly offers the possibility in the simplest manner of producing stemmed glassware fully automatically with stems profiled as desired.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. In a method for the production of stemmed glassware having a cup and a stem in which a stem is formed with a transverse cross sectional dimension intermediate the ends of stem smaller than the cross sectional dimensions at the ends of the stem, the steps comprising:

rotating a platen carrying at least one stem mold divided longitudinally into postion beneath a glass feeder, dropping a drop of glass from said glass feeder through a distance in the range of about 20 mm to 40 mm from the feeder, the glass drop forming a skin and being centered within the divided mold, rotating the platen to a pressing station to bring the mold with the drop therein beneath a pressing die, pressing the glass drop with the pressing die to form the stem in the divided mold, opening the divided mold and discharging the stem, and attaching the head of the stem to a cup to form the stemmed glassware and wherein the temperature of the glass in said glass feeder has been adjusted to a substantially constant temperature maintained within a deviation of 2° to 3°C within the temperature range of 1100° to 1200°C, adjusting the weight of the glass drop to within plus or minus one gram of a predetermined weight, pressing the glass drop with a pressure of about 200 kgs, and heating the stem mold and maintaining its temperature in the range of about 400°to 500°C during molding of the stem.

2. A method in accordance with claim 1 in which the stem mold is longitudinally divided into mold halves and an encircling ring is provided at the top of the mold halves and including the further steps of centering the divided mold halves by engaging a surface on said ring with surfaces on said mold halves, and during the step of pressing the glass drop forcing some of the glass against the ring to shape a portion of the stem base.

3. A method for the production of stemmed glassware in accordance with claim 2 in which the step of pressing the glass drop includes forcing the glass drop to abut surfaces to provide a uniform height for each glass stem while allowing the cross-sectional thickness of the stem base to vary with the quantity of glass introduced by the drop.

4. A method in accordance with claim 3 including the further steps of rotating the platen to bring the stem to a discharge station and shifting the stem upwardly through the ring to discharge the same.

5. A method in accordance with claim 4 including the further step of rotating the platen to a stem transfer station and transferring the stem while the head is still heated to a blowing mold for the cup, and in which the step of attaching the head of the stem to the cup includes inserting the head through an aperture in the blowing mold.

* * * * *